(12) United States Patent
Stockhammer

(10) Patent No.: US 11,438,647 B2
(45) Date of Patent: *Sep. 6, 2022

(54) SIGNALING MISSING SECTIONS OF MEDIA DATA FOR NETWORK STREAMING IN A MANIFEST FILE

(71) Applicant: QUALCOMM Incorporated, San Diego, CA (US)

(72) Inventor: Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,947

(22) Filed: May 8, 2019

(65) Prior Publication Data

US 2019/0349629 A1 Nov. 14, 2019

Related U.S. Application Data

(60) Provisional application No. 62/670,370, filed on May 11, 2018.

(51) Int. Cl.
*H04N 21/4402* (2011.01)
*H04L 65/61* (2022.01)
(Continued)

(52) U.S. Cl.
CPC ..... *H04N 21/4402* (2013.01); *H04L 65/4069* (2013.01); *H04N 19/37* (2014.11); *H04N 21/43074* (2020.08)

(58) Field of Classification Search
CPC ......... H04N 21/4402; H04N 21/85406; H04N 21/26258; H04N 21/8547; H04N 21/8456;
(Continued)

(56) References Cited

U.S. PATENT DOCUMENTS 9,253,233 B2 2/2016 Luby et al.
9,699,229 B2 7/2017 Stockhammer et al.
(Continued)

FOREIGN PATENT DOCUMENTS

CN 107077873 A 8/2017
WO 2015109228 A1 7/2015
WO 2018071149 A1 4/2018

OTHER PUBLICATIONS

Author: Ron Garrison Title: "Structure of a MPEG-DASH MPD—A Detailed Guide" URL: https://ottverse.com/structure-of-an-mpeg-dash-mpd/ Date: Apr. 1, 2021 (Year: 2021).*
(Continued)

*Primary Examiner* — John A Follansbee
*Assistant Examiner* — Kamal Hossain
(74) *Attorney, Agent, or Firm* — Campbell C. Chiang; Shumaker & Sieffert, P.A.

(57) ABSTRACT

An example device for retrieving media data includes a memory configured to store media data; and one or more processors implemented in circuitry and configured to: determine that a manifest file for a presentation of the media data includes data specifying a period of time of the presentation for which media data is not available but for which a segment timeline can be extended; retrieve a first set of segments of the presentation including media data having presentation times prior to the period of time; retrieve a second set of segments of the presentation including media data having presentation times after the period of time; in response to the determination that the manifest file includes the data specifying the period of time: omit retrieval of media data having presentation times during the period of time; and extend the segment timeline according to the determination.

28 Claims, 8 Drawing Sheets

(51) Int. Cl.

| | | |
|---|---|---|
| *H04N 19/37* | (2014.01) | |
| *H04N 21/43* | (2011.01) | |
| *H04L 67/02* | (2022.01) | |
| *H04L 65/612* | (2022.01) | |
| *H04L 65/60* | (2022.01) | |
| *H04N 21/262* | (2011.01) | |
| *H04N 21/8547* | (2011.01) | |
| *H04N 21/854* | (2011.01) | |
| *H04N 21/6332* | (2011.01) | |
| *H04N 21/643* | (2011.01) | |
| *H04N 21/845* | (2011.01) | |

(58) Field of Classification Search
CPC ......... H04N 21/64322; H04N 21/6332; H04N 21/4307; H04L 65/4069; H04L 65/4084; H04L 65/60; H04L 67/02
See application file for complete search history.

(56) References Cited

U.S. PATENT DOCUMENTS

| | | | |
|---|---|---|---|
| 10,681,104 B1* | 6/2020 | Wu | H04N 21/4344 |
| 2009/0178087 A1 | 7/2009 | Menn et al. | |
| 2013/0238758 A1 | 9/2013 | Lee et al. | |
| 2014/0032987 A1* | 1/2014 | Nagaraj | H04N 21/44209 714/E11.131 |
| 2014/0173677 A1* | 6/2014 | Lohmar | H04N 21/8456 725/116 |
| 2014/0281013 A1* | 9/2014 | Thang | H04L 65/4092 709/231 |
| 2015/0281306 A1* | 10/2015 | Barak | H04N 21/6582 725/93 |
| 2016/0255131 A1* | 9/2016 | Bulava | H04L 65/605 709/219 |
| 2017/0019444 A1* | 1/2017 | Minnick | H04N 21/47217 |
| 2017/0278545 A1* | 9/2017 | Woodward, Jr. | G11B 27/34 |
| 2018/0035176 A1* | 2/2018 | Stockhammer | H04L 65/602 |
| 2018/0098242 A1* | 4/2018 | Thienot | H04L 65/4076 |
| 2018/0103271 A1 | 4/2018 | Wang et al. | |
| 2018/0213294 A1* | 7/2018 | Lau | H04L 67/02 |
| 2018/0232287 A1 | 8/2018 | Katsumata et al. | |
| 2018/0352017 A1* | 12/2018 | Schneider | H04N 21/2353 |
| 2018/0367592 A1 | 12/2018 | Thomas et al. | |
| 2019/0020734 A1* | 1/2019 | Giladi | H04L 65/4069 |
| 2019/0215542 A1* | 7/2019 | Gandhi | H04N 21/234 |
| 2019/0313150 A1 | 10/2019 | Cava | |
| 2019/0349630 A1* | 11/2019 | Stockhammer | H04L 65/4069 |

OTHER PUBLICATIONS

3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH), 3GPP TS 26.247 V16.0.0, Release 16, Sep. 2018, 137 pages.
Fielding et al., "Hypertext Transfer Protocol—HTTP/1.1," Network Working Group, Request for Comments, RFC 2616, Jun. 1999, 114 pp.
"Guidelines for Implementation: DASH-IF Interoperability Points v3.0", DASH Industry Forum, Apr. 7, 2015 ( Apr. 7, 2015), pp. 1-154, XP055333561, Retrieved from the Internet: URL: https://dashif.org/w/2015/04/DASH-IF-IOP-v3.0.pdf [retrieved on Jan. 10, 2017], Sections 4.5.3.2 and 4.5.3.3.
"Guidelines for Implementations: DASH-IF Interoperability Points," Version 4.0, DASH Industry Forum, Dec. 12, 2016, 168 pages.
Hughes K., et al., "Common Media Application Format for Segmented Media", 3GPP Draft; 29N159922, 3rd Generation Partnership Project (3GPP), Mobile Competence Centre, 650, Route Des Lucioles ; F-06921 Sophia-Antipolis Cedex, France, vol. SA WG4, No. Sophia Antipolis, France; Jun. 29, 2016 (Jun. 29, 2016), 110 Pages, XP051122443, Retrieved from the Internet: URL: http://www.3gpp.org/ftp/tsg_sa/WG4_CODEC/TSGS4_89/Docs/ [retrieved on Jun. 29, 2016], Annex G.
Hughes K: "Representation of Missing Segments in DASH MPDs", 109.MPEG Meeting; Jul. 7, 2014-Jul. 11, 2014, Sapporo, (Motion Picture Expert Group or ISO/IEC JTC1/SC29/WG11), No. m34511, Jul. 8, 2014 (Jul. 8, 2014), 6 Pages, XP030062884, Sections 1-3.
International Search Report and Written Opinion—PCT/US2019/031597—ISA/EPO—dated Aug. 9, 2019.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 pp.
Paila T., et al., "FLUTE—File Delivery over Unidirectional Transport," Network Working Group, RFC 6726, Nov. 2012, Retrieved from http://tools.ietf.org/html/rfc6726, 46 Pages.
Qualcomm Incorporated: "MI-EMO: DASH Robustness Tools for Live Services", 3GPP Draft; S4-140585—DASH-Robustness, 3rd Generation Partnership Project (3GPP), Mobile Competence Centre, 650, Route Des Lucioles ; F-06921 Sophia-Antipolis Cedex, France, vol. SA WG4, No. Sophia Antipolis, France; May 12, 2014-May 16, 2014, May 7, 2014 (May 7, 2014), pp. 1-22, XP050839413, Retrieved from the Internet: URL: http://www.3gpp.org/ftp/tsg_sa/WG4_CODEC/TSGS4_79/Docs/ [retrieved on May 7, 2014], Sections 4.4.1, A.2.3.2 and A.2.3.3.
Singer D: "Recording the Absence of Data in an MP4 File", 116.MPEG Meeting; Oct. 17, 2016-Oct. 21, 2016, Chengdu; (Motion Picture Expert Group or ISO/IEC JTC1/SC29/WG11), No. m38920, Aug. 19, 2016 (Aug. 19, 2016), 4 Pages, XP030067268, Section 4.
"Text of ISO/IEC 23009-1:2014 PDAM 5 on Device Information and Other Extensions", 123.MPEG Meeting; Jul. 16, 2018-Jul. 20, 2018; Ljubljana; (Motion Picture Expert Group or ISO/IEC JTC1/SC29/WG11), No. n17811, Aug. 14, 2018 (Aug. 14, 2018), pp. 1-19, XP030190644, Retrieved from the Internet: URL: http://phenix.int-evry.fr/mpeg/doc_end_user/documents/123_Ljubljana/wg11/w17811-23009-1-PDAM5.docx [retrieved on Aug. 14, 2018], Section 6.
U.S. Appl. No. 16/406,956, filed May 8, 2019, 44 pages.
Qualcomm Incorporated et al., "Partial File Handling", S4-151202 revision of S4-151173, 3GPP TSG-SA4 Meeting #85, Kobe, Japan, Aug. 24-28, 2015, Change Request, 26.247, CR 0083, rev 3, Current version: 13.0.0, 4 Pages.
Brendan L., "The Structure of an MPEG-DASH MPD", Brendan Long Website, Mar. 20, 2015, pp. 1-5, Retrieved from the Internet: URL: https://www.brendanlong.com/the-structure-of-an-mpeg-dash-mpd.html, [retrieved on Mar. 19, 2021].
Chen S., et al., "Segment-Based Streaming Media Proxy: Modeling and Optimization", IEEE Transactions on Multimedia vol. 8, No. 2, Mar. 20, 2006, pp. 243-256.
Shichao W., et al., "Research on Machine Sketch Method Based on Image Hierarchy", Computer Systems & Applications, vol. 26, No. 9, Sep. 30, 2017, pp. 264-268, 16 Pages.

* cited by examiner

SIGNALING MISSING SECTIONS OF MEDIA DATA FOR NETWORK STREAMING IN A MANIFEST FILE

This application claims the benefit of U.S. Provisional Application No. 62/670,370, filed May 11, 2018, the entire contents of which are hereby incorporated by reference.

TECHNICAL FIELD

This disclosure relates to transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for signaling missing sections of media data for network streaming services, such as Dynamic Adaptive Streaming over HTTP (DASH). In some cases, expected media data of segments may not be present due to failures in different parts of a streaming system. In accordance with the techniques of this disclosure, such expected media data may be signaled in a segment as missing sections, which allow extension of a segment timeline in a receiving device. That is, the receiving device can retrieve media data having presentation times after the missing section and output the media data, without outputting desired media data for the missing section. Additionally or alternatively, missing sections may be signaled in a manifest file, such that receiving devices may avoid requesting the missing sections.

In one example, a method of retrieving media data includes determining that a manifest file for a presentation of media data includes data specifying a period of time of the presentation for which media data is not available but for which a segment timeline can be extended; retrieving a first set of segments of the presentation including media data having presentation times prior to the period of time; in response to the determination that the manifest file includes the data specifying the period of time: omitting retrieval of media data having presentation times during the period of time; retrieving a second set of segments of the presentation including media data having presentation times after the period of time; and extending the segment timeline according to the determination.

In another example, a device for retrieving media data includes a memory configured to store media data; and one or more processors implemented in circuitry and configured to: determine that a manifest file for a presentation of the media data includes data specifying a period of time of the presentation for which media data is not available but for which a segment timeline can be extended; retrieve a first set of segments of the presentation including media data having presentation times prior to the period of time; retrieve a second set of segments of the presentation including media data having presentation times after the period of time; in response to the determination that the manifest file includes the data specifying the period of time: omit retrieval of media data having presentation times during the period of time; and extend the segment timeline according to the determination.

In another example, a computer-readable storage medium has stored thereon instructions that, when executed, cause a processor to determine that a manifest file for a presentation of media data includes data specifying a period of time of the presentation for which media data is not available but for which a segment timeline can be extended; retrieve a first set of segments of the presentation including media data having presentation times prior to the period of time; retrieve a second set of segments of the presentation including media data having presentation times after the period of time; in response to the determination that the manifest file includes the data specifying the period of time: omit retrieval of media data having presentation times during the period of time; and extend the segment timeline according to the determination.

In another example, a device for retrieving media data includes means for determining that a manifest file for a presentation of media data includes data specifying a period of time of the presentation for which media data is not available but for which a segment timeline can be extended; means for retrieving a first set of segments of the presentation including media data having presentation times prior to the period of time; means for retrieving a second set of segments of the presentation including media data having presentation times after the period of time; means for omitting retrieval of media data having presentation times during the period of time in response to the determination that the manifest file includes the data specifying the period of time; and means for extending the segment timeline according to the determination in response to the determination that the manifest file includes the data specifying the period of time.

In another example, a method of retrieving media data includes retrieving at least a portion of a first segment of a representation of media data, the at least portion of the first segment including data indicating that the first segment includes a missing section representing a period of time for which media data is not available but for which a segment timeline can be extended; retrieving media data of a second segment having a presentation time following the missing section; extending the segment timeline according to the data of the at least portion of the first segment; and outputting the media data of the second segment according to the extended segment timeline.

In another example, a device for retrieving media data includes a memory configured to store media data; and one or more processors implemented in circuitry and configured to: retrieve at least a portion of a first segment of a representation of the media data, the at least portion of the first segment including data indicating that the first segment includes a missing section representing a period of time for which media data is not available but for which a segment timeline can be extended; retrieve media data of a second segment having a presentation time following the missing section; extend the segment timeline according to the data of the at least portion of the first segment; and output the media data of the second segment according to the extended segment timeline.

In another example, a computer-readable storage medium has stored thereon instructions that, when executed, cause a processor to retrieve at least a portion of a first segment of a representation of the media data, the at least portion of the first segment including data indicating that the first segment includes a missing section representing a period of time for which media data is not available but for which a segment timeline can be extended; retrieve media data of a second segment having a presentation time following the missing section; extend the segment timeline according to the data of the at least portion of the first segment; and output the media data of the second segment according to the extended segment timeline.

In another example, a device for retrieving media data includes means for retrieving at least a portion of a first segment of a representation of media data, the at least portion of the first segment including data indicating that the first segment includes a missing section representing a period of time for which media data is not available but for which a segment timeline can be extended; means for retrieving media data of a second segment having a presentation time following the missing section; means for extending the segment timeline according to the data of the at least portion of the first segment; and means for outputting the media data of the second segment according to the extended segment timeline.

The details of one or more examples are set forth in the accompanying drawings and the description below. Other features, objects, and advantages will be apparent from the description and drawings, and from the claims.

DETAILED DESCRIPTION

Figure 1:
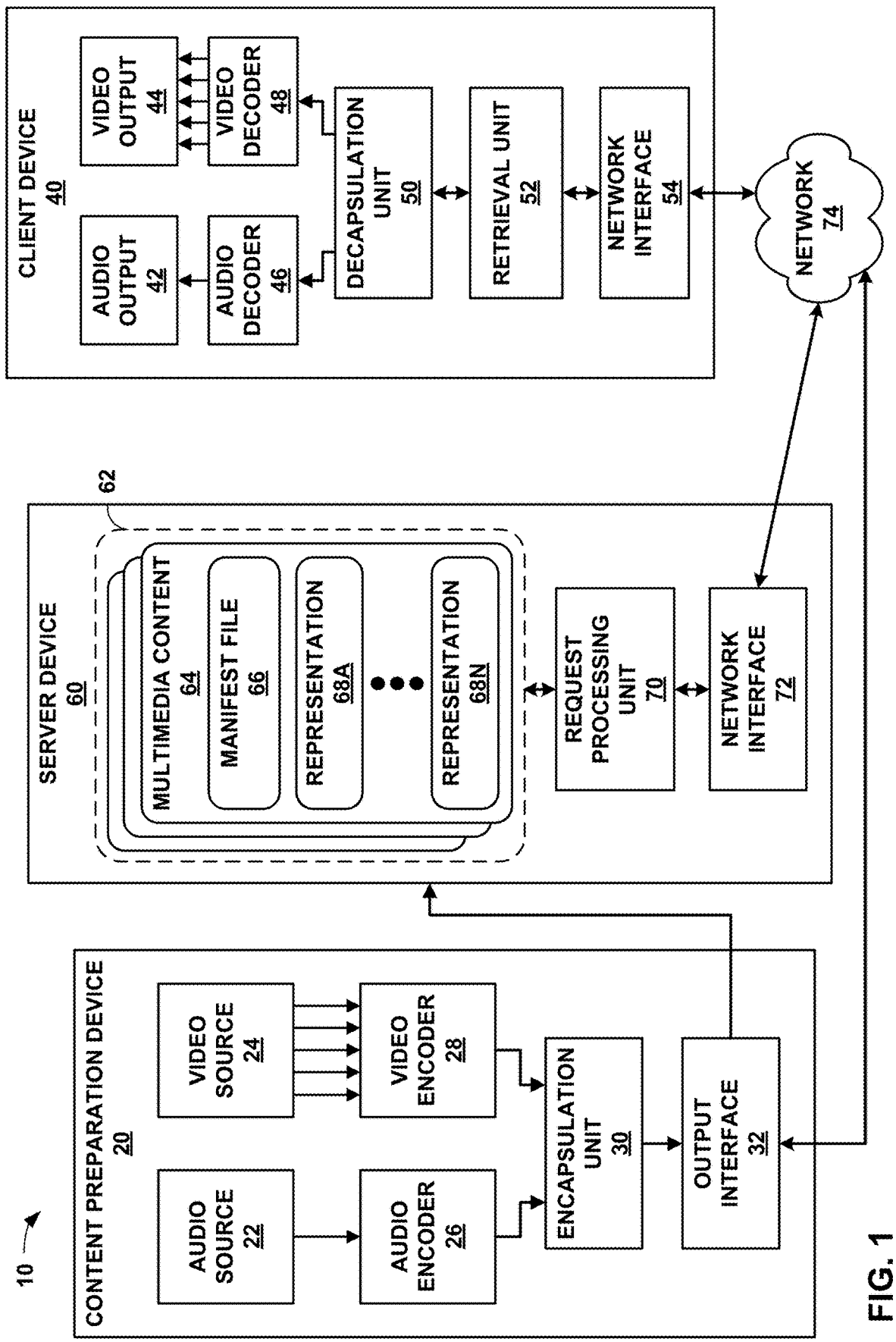
FIG. 1 is a block diagram illustrating an example system that implements techniques for streaming media data over a network.

In general, this disclosure describes techniques for signaling missing sections of media data for network streaming services, such as Dynamic Adaptive Streaming over HTTP (DASH), HTTP Live Streaming (HLS), Microsoft Smooth Streaming, or the like.

In case of linear (live) distribution, expected segments may not necessarily be present due to failures in different parts of the end-to-end system. A good overview of use cases appears in Section 4.8 of DASH Industry Forum, "Guidelines for Implementation: DASH-IF Interoperability Points," Version 4, Dec. 12, 2016, available at dashif.org/wp-content/uploads/2016/12/DASH-IF-IOP-v4.0-clean.pdf.

One such example is encoder/packager failures. If an encoder/packager fails for some reason, and a redundant encoder/packager starts outputting segments, there may be a gap of one or more segments between the last segment written to origin by the primary encoder/packager and the first segment written by the redundant encoder/packager.

Another example is when the encoder output is an MPEG-2 TS User Datagram Protocol (UDP) multicast with virtual segmentation such as CableLabs EBP or MPEG-2 boundary descriptors. This approach does not use reliable multicast protocols. A UDP packet from such deployment may contain seven MPEG-2 TS packets and no other data. When losses occur, segments may not be produced by the downstream packagers.

Yet another example is when different representations are generated by different encoders/packagers. In this case, when an encoder fails, there may be a gap only for one or more of the representations, but the remaining representation(s) will still have an available segment.

Two example issues may occur as a result of the discussion above. In one example, if no segment is produced, then a request (e.g., an HTTP GET or partial GET request) for such a segment may result in an error, such as an HTTP 404 error. Producing a broad set of 404 errors in operation is undesirable, as it generates unnecessary operational burden for content delivery networks (CDNs). Secondly, without the production of a segment, at least in certain cases, the operational flow of the client may be interrupted, especially when the DASH main live client according to the DASH-IF TOP is used. The loss of a segment results that no longer event message (EMSG) and no longer the segment information can be distributed as document in DASH-IF TOP v. 4.0, clause 4.5.3, in order to continue operation. The DASH client may then rely on an MPD update to continue understanding the details (e.g., subsequent media data).

To address these issues, DASH provides a mechanism to cope with segment losses using the SegmentTimeline element. A gap can be calculated from the difference in the expected value of S@t calculated from the previous S elements, and the value of S@t. However, a potential problem of this approach is that, in the case of segment losses in a representation, a SegmentTimeline at the representation level may be used, rather than at the adaptation set level as it is typically done. Using SegmentTimeline at the adaptation set level would apply to all the representations, which would be incorrect in case the loss is specific to a subset of the representations.

Use of representation-level SegmentTimeline adds extra XML elements to every representation. This works well in case of segments of precisely the same duration as large @r values can reduce the number of S elements needed to express all of the segments. When segments of similar but not equal durations are used (e.g., 2-second segments with +/−1 second variation), SegmentTimeline may quickly grow fairly large. Given the need to repeat the same information for all representations within an adaptation set, and in case of a large number of representations (e.g., 14), this results in very large manifest files such as media presentation descriptions (MPDs), both in bytes and in number of XML elements. The negative effect of large MPD sizes is network overhead. The negative effects of a large number of XML elements is the increase in the MPD parse time and memory usage on the client side.

The techniques of this disclosure generally concern using a common SegmentTimeline at the adaptation set level (which applies to all the representations in this adaptation set). This allows for a relatively smaller MPD in size with fewer elements compared to signaling representation-level SegmentTimeline elements, but having a representation-level indication for missing sections (e.g., within segments or full missing segments).

Additionally or alternatively, a content preparation device may add a dummy segment to replace missing information. For example, an encoder, encapsulation unit, DASH packager, or the like may produce a well identified segment that is marked such that a DASH client can identify the segment as missing or non-complete. Therefore, the DASH client may send data to a corresponding media decoder indicating the issue, i.e., that media data is missing. As another option, the DASH packager may produce a valid segment for which the content may represent a black screen or one or more error messages. In both cases, this addition may cause confusion by the viewer. Thus, a client device may avoid displaying the error messages or black screen if other representations provide valid alternatives. Therefore, even such segments and media sections may be avoided. For this purpose, the DASH client may need to be aware of the dummy segment or well identified error-indicative segment.

In general, the techniques of this disclosure include two aspects. First, in the live case, a content generation device (e.g., an encapsulation unit thereof) may generate and insert segments that are not complete or entirely missing and that are clearly marked as containing a missing section (e.g., the segment is a missing section segment), but permit extension of the timeline in a receiver device without manifest file updates (such as MPD updates). Second, signaling for missing sections may be included in the manifest file (such as an MPD) such that clients (e.g., receiving devices) that have access to the MPD can make use of the information and avoid requesting the segments with missing information. Segments with "missing" information may refer to segments as discussed above (e.g., segments that are not complete or are entirely missing and marked as such), or may refer to content that is not desired main media content, such as a black screen or error messages.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some cases, such as live streaming, various components of content preparation device 20 may encounter an error, as discussed above. Various error scenarios are discussed in Section 4.8 of DASH-IF TOP v. 4, as noted above. Encapsulation unit 30 may detect such an error and perform various techniques of this disclosure in response. For example, encapsulation unit 30 may generate small segments that are marked as missing section segments. Additionally or alternatively, encapsulation unit 30 may generate manifest file 66 to include information indicating the missing section segments, such that client device 40 may use the information of manifest file 66 to avoid requesting the missing section segments, to avoid wasting bandwidth of, e.g., network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

As noted above, retrieval unit 52 of client device 40 may determine that manifest file 66 indicates that one or more segments of one or more representations 68 are missing section segments. In response, retrieval unit 52 may avoid retrieval of the missing section segments as indicated by manifest file 66. Additionally or alternatively, retrieval unit 52 may determine that a retrieved segment is marked as a missing section segment. Retrieval unit 52 may nevertheless extend a playback timeline without receiving an update to manifest file 66.

In some examples, content preparation device 20, server device 60, and client device 40 may be configured according to modifications to DASH as discussed below:

5.3.9.7 Missing Section Signalling 5.3.9.7.1 General

In certain cases, a time continuous section of a Representation or an Adaptation Set is not properly represented, for example due to errors in the content generation. However, at least on DASH level the content should be offered properly, for example by adding a Missing Section Segment or by including content that is encoded but not representing the actual main media content.

The MissingSection element enables to express such sections that should be avoided by the DASH client, for example by switching to a Representation that does not include such a Missing section.

The MissingSection element shall contain a list of S elements each of which describes a sequence of contiguous Missing sections. The S element contains an optional @d attribute specifying the MPD duration of the Missing section and a @t time attribute whereby the value of the @t attribute minus the value of the @presentationTimeOffset specifies the MPD start time of the Missing section.

The semantics of the attributes and elements for Missing Section are provided in 5.3.9.7.2, Table XX. The XML syntax of the Segment Timeline is provided in 5.3.9.7.3.

5.3.9.7.2 Semantics

TABLE XX

Semantics of SegmentTimeline element

| Element or Attribute Name | Use | Description |
| --- | --- | --- |
| MissingSection | | specifies all Missing sections of the associated Representation |
| S | 1 . . . N | specifies one Missing section |
| @t | M | this value of this attribute minus the value of the @presentationTimeOffset specifies the MPD start time, in @timescale units, of the first sample in the Missing section. The value of this attribute must be equal to or greater than the sum of the previous S element earliest presentation time and the sum of the contiguous section durations. |
| @d | O | specifies the Missing section duration in units of the value of the @timescale. If not present, the Missing section lasts until the end of the S element, the start of the next S element, the end of the Period or until the next MPD update. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

5.3.9.7.3 XML Syntax

```
<!-- Segment Timeline -->
<xs:complexType name="MissingSectionType">
 <xs:sequence>
  <xs:element name="S" minOccurs="1" maxOccurs="unbounded" >
   <xs:complexType>
    <xs:attribute name="t" type="xs:unsignedLong" use="required"/>
    <xs:attribute name="d" type="xs:unsignedLong"/>
    <xs:anyAttribute namespace="##other" processContents="lax"/>
   </xs:complexType>
  </xs:element>
  <xs:any namespace="##other" processContents="lax" minOccurs="0" maxOccurs="unbounded"/>
 </xs:sequence>
 <xs:anyAttribute namespace="##other" processContents="lax"/>
</xs:complexType>
```

Thus, content preparation device 20 and/or server device 60 may signal a MissingSection element of manifest file 66, which may be an MPD. Likewise, retrieval unit 52 of client device 40 may use the MissingSection element of manifest file 66 to determine one or more segments (or portions of segments) of one or more of representations 68 that are not to be retrieved. That is, the segments or portions thereof may correspond to playback times for which no media data is available.

Additionally or alternatively, in some examples, content preparation device 20, server device 60, and client device 40 may be configured according to modifications to DASH as discussed below.

The following is proposed specification text for MPEG-DASH ISO/IEC 23009-1, according to which content preparation device 20, server device 60, and client device 40 may be configured:

A Missing Section Segment is defined for the purpose to extend the Segment Timeline, even if the data in the Segment may not be present or is only partially present. The Segment may not contain any media data, i.e. neither a Movie Fragment Header nor a media data (mdat) box may be present. It may also contain only a subset of the data. If the Segment is not a valid media segment and the content provider expects the DASH client to signal the absence of media for the span, then the segment shall include a major brand 'miss'. The Segment may contain also an 'emsg', for example, to indicate an MPD validity expiration. In addition, for a Missing Section segment, the following shall hold:

a single Segment Index ('sidx') box shall be present and the values of the Segment Index shall describe accurate timing of the Segment Timeline, i.e.:

the earliest_presentation_time in the 'sidx' box shall be the value of S@t as signaled in the Segment Timeline in the MPD.

the Subsegment_duration fields in the 'sidx' box shall be the value of S@d as signaled in the Segment Timeline in the MPD.

Note: by forcing these values, the DASH client is able to properly extend the Segment Timeline even though no actual media data may be present.

The following is proposed specification text for DASH-IF IOP, according to which content preparation device 20, server device 60, and client device 40 may be configured:

If the DASH client receives a segment with major brand 'miss', the DASH client shall use the Segment Index ('sidx') box to extend the timeline. If the segment does not contain all media as indicated in the Segment Index, the DASH client should inform the media decoder on missing information.

In this manner, content preparation device 20 and/or server device 60 may signal data in a segment index (SIDX) box of a segment including missing sections, the data indicating an earliest_presentation_time and duration of the missing sections. Likewise, client device 40 may determine that the segment timeline is to be extended based on the information of the SIDX box. Additionally, in some examples, client device 40 may retrieve alternative media data for the missing section or determine that no media data is to be played for the missing section. The alternative media data may be, for example, a black screen, one or more error messages, or the like.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
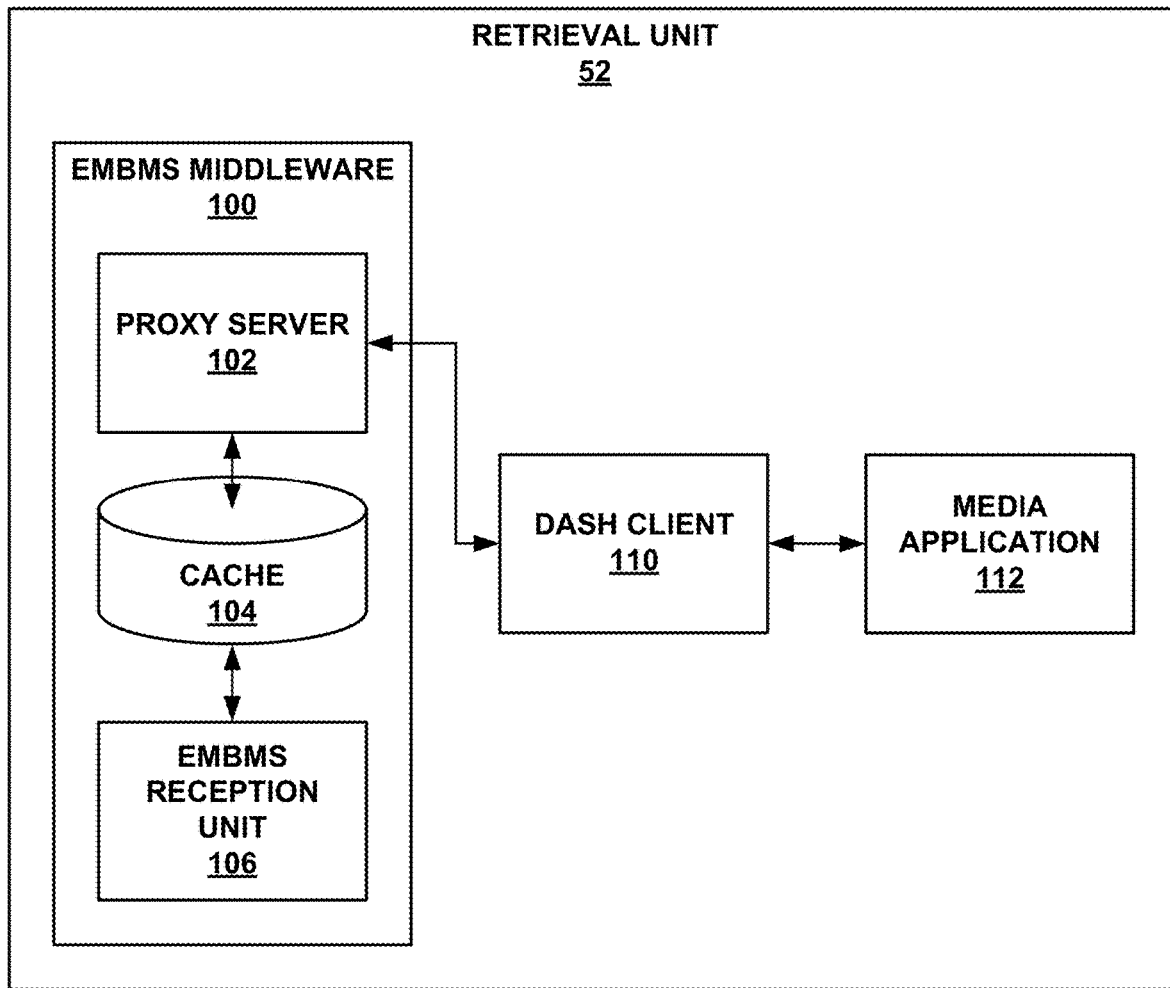
FIG. 2 is a block diagram illustrating an example set of components of a retrieval unit in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide an MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

Figure 3:
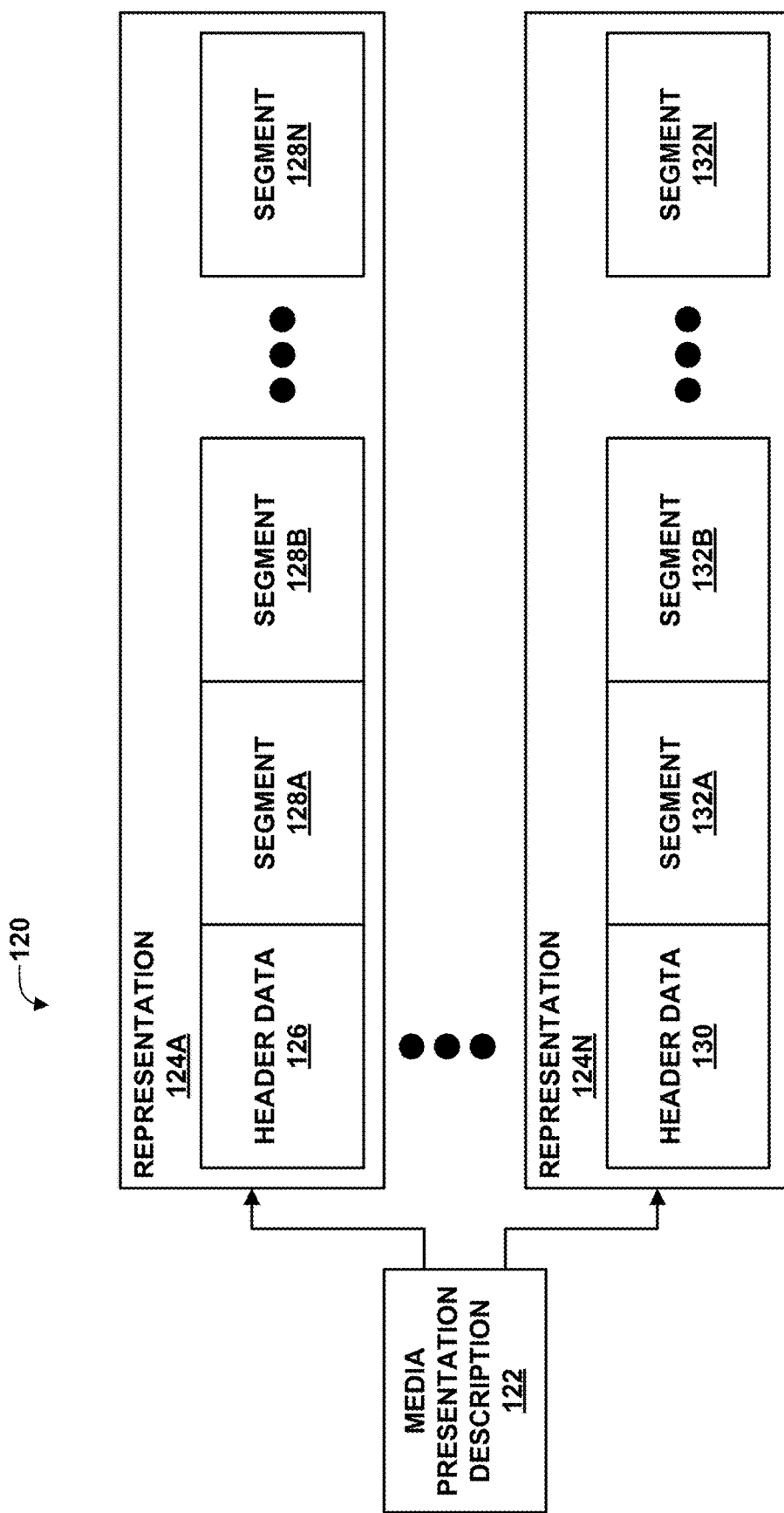
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

In accordance with the techniques of this disclosure, MPD 122 may include a MissingSection element as discussed above, to indicate that one or more of segments 128 and/or 132 are missing section segments. If segment 128B is a missing section segment, for example, client device 40 may alternatively retrieve segment 132B, which has a playback time overlapping the missing section of representation 124A (i.e., segment 128B). In this example, segments 128B and 132B include media data having the same playback time, also referred to herein as presentation time. Thus, media data of segment 132B can act as replacement media data for segment 128B when segment 128B includes a missing section (e.g., some or all of the media data of segment 128B is missing and cannot be retrieved). Client device 40 may select segment 132B as a replacement segment for segment 128B based on representation 124N and representation 124A being in the same adaptation set, for example.

Figure 4:
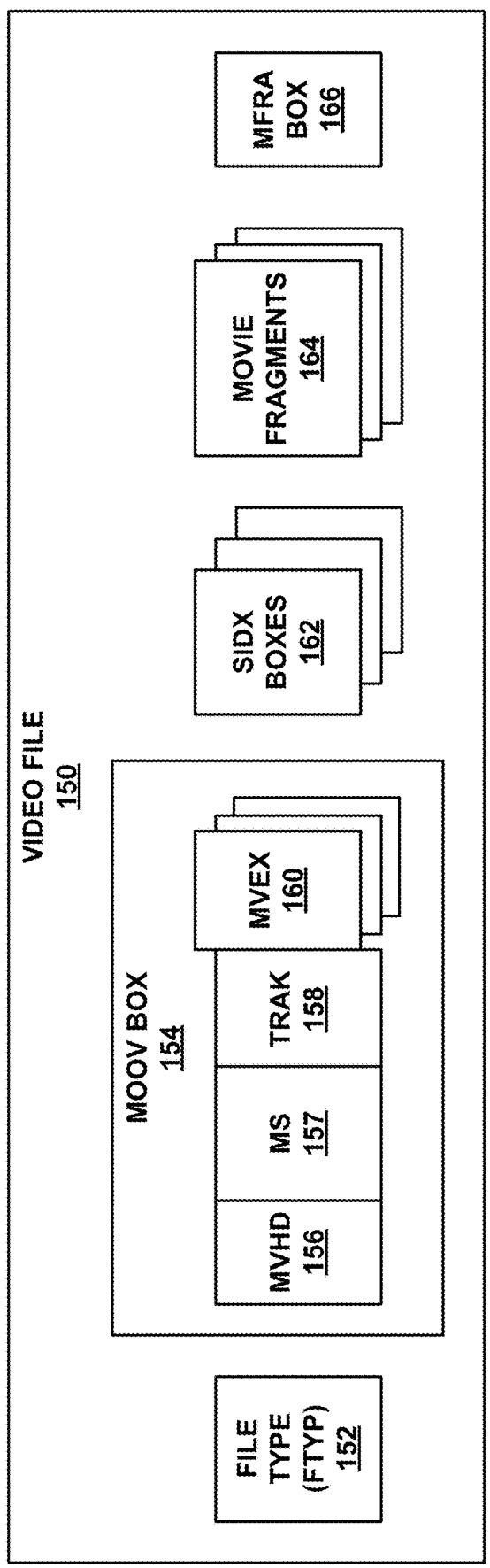
FIG. 4 is a block diagram illustrating elements of an example video file.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (SIDX) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, missing section (MS) box 157, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

MS box 157 may include information indicating that one or more sections of video file 150 are not properly represented, e.g., due to errors in content generation. MS box 157 allows a client device, such as client device 40, to avoid such sections, e.g., by switching to a representation that does not include such a missing section. MS box 157 may include a list of S elements, each of which may describe a sequence of contiguous missing sections. The S element may contain an optional @d attribute specifying the MPD duration of the missing section and an @t time attribute having a value from which the value of @presentationTimeOffset can be subtracted to specify the MPD start time of the missing section. MS box 157 may be included in a SegmentTimeline element (not shown) of video file 150, which may be included in MOOV box 154.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or SIDX boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

In accordance with the techniques of this disclosure, if video file 150 includes a missing section, video file 150 may include a single SIDX box 162 having an earliest_presentation_time element having the value of S@t as signaled in the manifest file (e.g., MPD) and a Subsegment_duration field having the value of S@d as signaled in the manifest file (e.g., MPD). In some examples, video file 150 may include only SIDX box 162, without MOOV box 154 and/or movie fragments 164. In other examples, video file 150 may include both media data (e.g., movie fragments 164) and one or more SIDX boxes 162 signaling a missing section for which no movie fragments 164 are available.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150. Movie fragments 164 may not be present in video file 150 when video file 150 is a missing section segment.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence. MFRA box 166 may not be present in video file 150 when video file 150 is a missing section segment.

Figure 5:
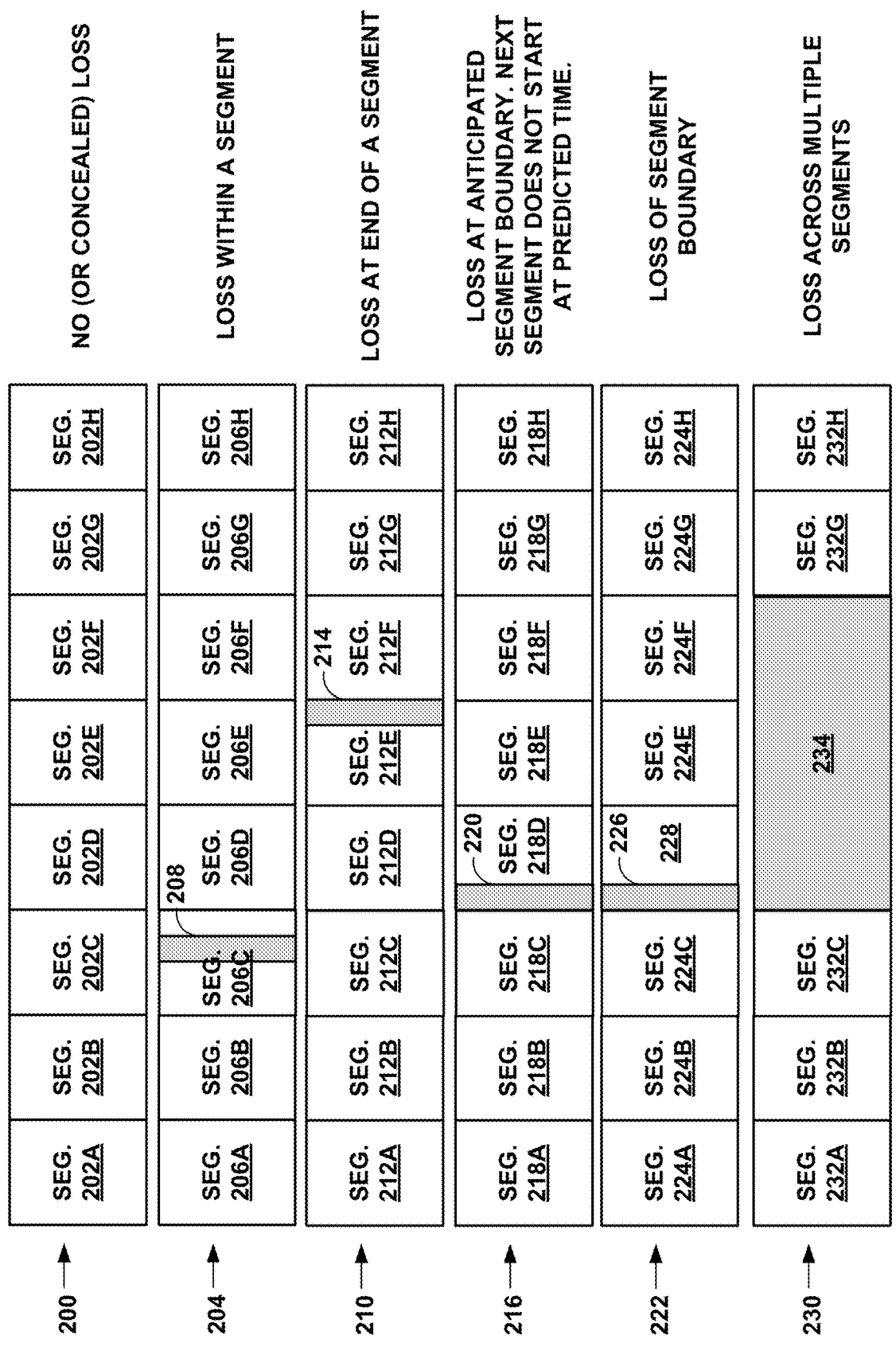
FIG. 5 is a conceptual diagram illustrating various examples of scenarios in which loss of media data of one or more segments may occur.

FIG. 5 is a conceptual diagram illustrating various examples of scenarios in which loss of media data of one or more segments may occur. In various examples, part of a segment may be lost (and thus not provide proper content), a full segment may be lost, or multiple segments may be lost. In some cases, it may also be the case that only the initial part of a Segment can be produced. Some examples are shown in FIG. 5.

In particular, FIG. 5 depicts a first example sequence of segments 200 including segments 202A-202H, in which there is no actual or concealed loss. FIG. 5 also depicts a second example sequence of segments 204 including segments 206A-206H, in which segment 206C includes a missing section 208 due to loss of media data. FIG. 5 also depicts a third example sequence of segments 210 including segments 212A-212H, in which there is loss at the end of segment 212E, such that segment 212E includes missing section 214. FIG. 5 also depicts a fourth example sequence of segments 216 including segments 218A-218H, in which there is loss at an anticipated segment boundary of segment 218D that includes missing section 220, which may cause segment 218D not to start at a predicted time. FIG. 5 also depicts a fifth example sequence of segments 222 including segments 224A-2224C and 224E-224H in which there is a loss resulting in missing section 226 at the segment boundary for a missing segment 228 following segment 224C and before segment 224E. FIG. 5 also depicts a sixth example sequence of segments 230 including segments 232A-232C, 232G, and 232H, in which there is a loss of media data resulting in missing section 234 across multiple segments.

In accordance with the techniques of this disclosure, a manifest file may include a Missing Section element to signal any of missing sections 208, 214, 220, 226, and/or 234. Likewise, segment 206C may include data (such as a SIDX box) to signal missing section 208; segment 212E may include data to signal missing section 214; and segment 218D may include data to signal missing section 220.

Figure 6:
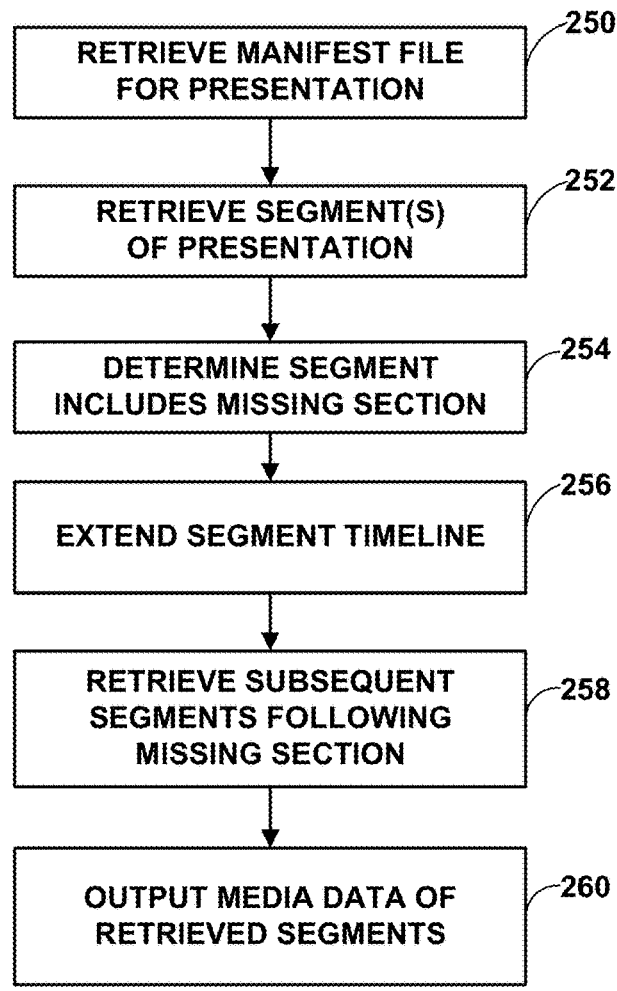
FIG. 6 is a flowchart illustrating an example method of determining that streamed media data includes a missing section, according to the techniques of this disclosure.

FIG. 6 is a flowchart illustrating an example method of determining that streamed media data includes a missing section according to the techniques of this disclosure. The method of FIG. 6 may be performed by, e.g., retrieval unit 52 of client device 40 of FIG. 1, for example. However, it should be understood that other devices may be configured to perform this or a similar method in accordance with the techniques of this disclosure.

Initially, retrieval unit 52 may retrieve a manifest file for a presentation of media data (250). The manifest file may be, for example, a media presentation of DASH. In other examples, other manifest files for other streaming protocols, such as HTTP Live Streaming (HLS), Adobe HTTP Dynamic Streaming (HDS), Microsoft Smooth Streaming (MSS), or the like.

The manifest file may include data indicating network locations (e.g., URLs) of segments of media data. Thus, retrieval unit 52 may use the manifest file to retrieve one or more of the segments of the presentation (252). In particular, as explained above, retrieval unit 52 may determine coding and rendering capabilities of client device 40, as well as a currently available network bandwidth, to select an adaptation set and a representation within the adaptation set, then determine the URLs of segments of the selected representation, and send requests for the segments.

In some examples, the manifest file may include a Missing Section element, as discussed above. In particular, the manifest file may include one or more Missing Section elements, each of which may signal a start time and duration of a corresponding period of playback time for which media data is not available. Additionally or alternatively, one or more of the segments may include data indicating that the segment includes a missing section. For example, the segment may include a segment index (SIDX) box indicating a starting time and a duration of the missing section of the segment. Accordingly, using the manifest file and/or the data of one or more of the segments themselves, retrieval unit 52 may determine that the segment includes a missing section (254).

In response to determining that the segment includes the missing section, and using the data indicative of the missing section (e.g., a start time and duration of the missing section), retrieval unit 52 may extend the segment timeline (256) to account for the missing section. In particular, retrieval unit 52 may determine that no media data is available for the missing section, and thus, retrieval unit 52 may avoid attempting to retrieve additional media data for the missing section. In some examples, retrieval unit 52 may retrieve alternative, replacement media data for the missing section, such as a black screen or an error message.

Retrieval unit 52 may further proceed to retrieve subsequent segments following the missing section (258). Retrieval unit 52 may also output media data of the retrieved segments (260). In particular, retrieval unit 52 may output media data of the retrieved segments that is outside of the missing section. In some cases, retrieval unit 52 may output the replacement media data for the missing section.

In this manner, the method of FIG. 6 represents an example of a method including determining that a manifest file for a presentation of media data includes data specifying a period of time of the presentation for which media data is not available but for which a segment timeline can be extended; retrieving a first set of segments of the presentation including media data having presentation times prior to the period of time; in response to the determination that the manifest file includes the data specifying the period of time: omitting retrieval of media data having presentation times during the period of time; retrieving a second set of segments of the presentation including media data having presentation times after the period of time; and extending the segment timeline according to the determination.

Additionally, the method of FIG. 6 also represents an example of a method including retrieving at least a portion of a first segment of a representation of media data, the at least portion of the first segment including data indicating that the first segment includes a missing section representing a period of time for which media data is not available but for which a segment timeline can be extended; retrieving media data of a second segment having a presentation time following the missing section; extending the segment timeline according to the data of the at least portion of the first segment; and outputting the media data of the second segment according to the extended segment timeline.

Figure 7:
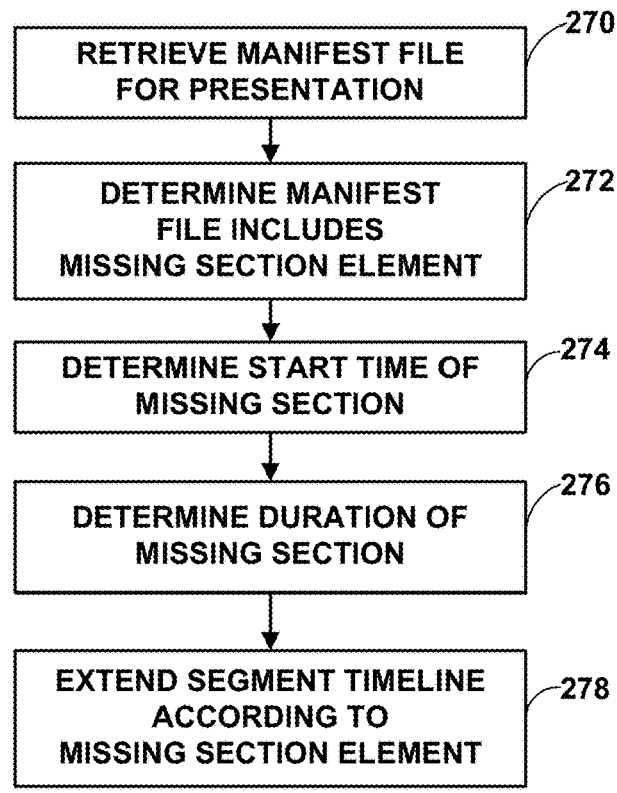
FIG. 7 is a flowchart illustrating an example of a method for retrieving a manifest file including data indicating that a presentation includes a missing section, according to the techniques of this disclosure.

FIG. 7 is a flowchart illustrating an example of a method for retrieving a manifest file including data indicating that a presentation includes a missing section, according to the techniques of this disclosure. The method of FIG. 7 may be performed by, e.g., retrieval unit 52 of client device 40 of FIG. 1, for example. However, it should be understood that other devices may be configured to perform this or a similar method in accordance with the techniques of this disclosure.

Initially, retrieval unit 52 may retrieve a manifest file for a presentation of media data (270). The manifest file may be, for example, a media presentation of DASH. In other examples, other manifest files for other streaming protocols, such as HTTP Live Streaming (HLS), Adobe HTTP Dynamic Streaming (HDS), Microsoft Smooth Streaming (MSS), or the like.

The manifest file may include data indicating network locations (e.g., URLs) of segments of media data. Thus, retrieval unit 52 may use the manifest file to retrieve one or more of the segments of the presentation. In particular, as explained above, retrieval unit 52 may determine coding and rendering capabilities of client device 40, as well as a currently available network bandwidth, to select an adaptation set and a representation within the adaptation set, then determine the URLs of segments of the selected representation, and send requests for the segments.

Additionally, in this example, retrieval unit 52 determines that the manifest file includes a Missing Section element (272). For example, the Missing Section element may signal a start time and a duration of a period of time for which media data is not available. Thus, retrieval unit 52 may determine the start time of the missing section (274) and a duration of the missing section (276) using the manifest file. The start time may be indicated by an S@t element of the manifest file, while the duration may be indicated by an S@d element of the manifest file.

Retrieval unit 52 may then extend the segment timeline according to the Missing Section element of the manifest file (278). Although not shown in FIG. 7 explicitly, In this manner, the method of FIG. 7 represents an example of a method including determining that a manifest file for a presentation of media data includes data specifying a period of time of the presentation for which media data is not available but for which a segment timeline can be extended; retrieving a first set of segments of the presentation including media data having presentation times prior to the period of time; in response to the determination that the manifest file includes the data specifying the period of time: omitting retrieval of media data having presentation times during the period of time; retrieving a second set of segments of the presentation including media data having presentation times after the period of time; and extending the segment timeline according to the determination.

Figure 8:
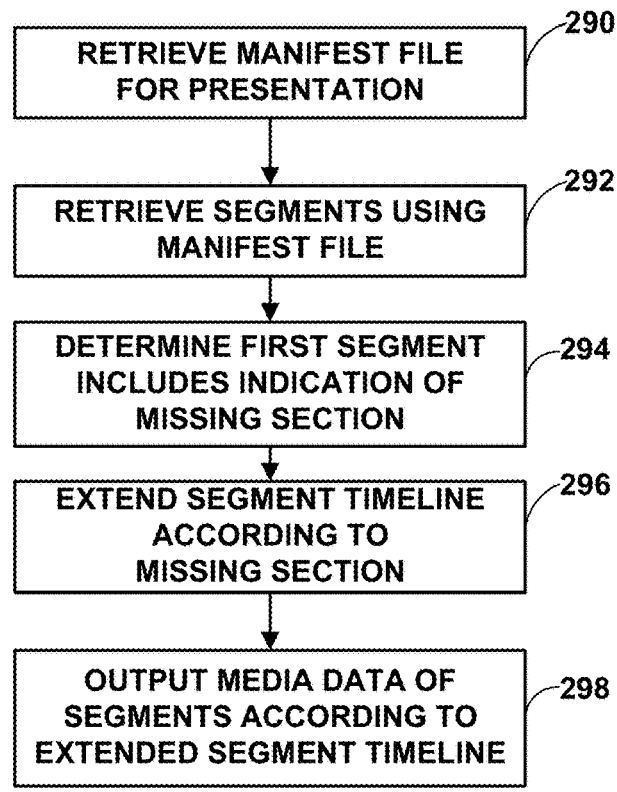
FIG. 8 is a flowchart illustrating an example of a method for retrieving a segment including data indicating that the segment includes a missing section, according to the techniques of this disclosure.

FIG. 8 is a flowchart illustrating an example of a method for retrieving a segment including data indicating that the segment includes a missing section, according to the techniques of this disclosure. The method of FIG. 8 may be performed by, e.g., retrieval unit 52 of client device 40 of FIG. 1, for example. However, it should be understood that other devices may be configured to perform this or a similar method in accordance with the techniques of this disclosure.

Initially, retrieval unit 52 may retrieve a manifest file for a presentation of media data (290). The manifest file may be, for example, a media presentation of DASH. In other examples, other manifest files for other streaming protocols, such as HTTP Live Streaming (HLS), Adobe HTTP Dynamic Streaming (HDS), Microsoft Smooth Streaming (MSS), or the like.

The manifest file may include data indicating network locations (e.g., URLs) of segments of media data. Thus, retrieval unit 52 may use the manifest file to retrieve segments of the presentation (292). In particular, as explained above, retrieval unit 52 may determine coding and rendering capabilities of client device 40, as well as a currently available network bandwidth, to select an adaptation set and a representation within the adaptation set, then determine the URLs of segments of the selected representation, and send HTTP Get or partial Get requests for the segments.

Retrieval unit 52 may then determine that a nominal first retrieved segment includes an indication of a missing section (294). That is, the first segment may be retrieved after other segments, but is referred to as "first" nominally to refer specifically to a segment having data indicating that the segment includes a missing section. The first segment may include a SIDX box indicating a start time and duration of the missing section. Retrieval unit 52 may determine a subsegment for which no media is available using, e.g., an earliest_presentation time field and a subsegment_duration field of the SIDX box of the first segment. The first segment may further include a major brand of "miss," to indicate that the first segment includes the SIDX box signaling the missing section thereof. Moreover, retrieval unit 52 may extract an event message (emsg) element from the segment, indicating expiration of the manifest file. Thus, retrieval unit 52 may use the data of the emsg element to retrieve a new, valid manifest file.

Retrieval unit 52 may use the indication of the missing section to extend the segment timeline (296), that is, to avoid attempting to retrieve media data for the missing section and without sending actual media data of the first segment for the missing section to, e.g., a video decoder (such as video decoder 48 of FIG. 1). In some examples, retrieval unit 52 may output replacement media data, such as a black screen or error message, and additionally or alternatively output an indication of the missing section to, e.g., video decoder 48. To obtain the replacement media data, retrieval unit 52 may retrieve a segment of a different representation corresponding to the missing section.

Alternatively, retrieval unit 52 may determine that a replacement segment of a different representation includes valid media data having the same presentation time as the missing of the first segment. Thus, retrieval unit 52 may retrieve the replacement segment in response to determining that the first segment includes the missing section. The different representation may be within the same adaptation set, but have, e.g., a lower bitrate than the representation including the first segment. In cases where retrieval unit 52 retrieves the replacement segment from a different representation, retrieval unit 52 may also output the media data of the replacement segment to extend the segment timeline.

Furthermore, retrieval unit 52 may output media data of the segments that is outside of the missing section according to the extended segment timeline (298). For example, retrieval unit 52 may output media data having presentation times preceding the missing section and media data having presentation times following the missing section to video decoder 48, where the media data may be included in the first segment or a second, subsequent segment (in presentation time).

In this manner, the method of FIG. 8 represents an example of a method including retrieving at least a portion of a first segment of a representation of media data, the at least portion of the first segment including data indicating that the first segment includes a missing section representing a period of time for which media data is not available but for which a segment timeline can be extended; retrieving media data of a second segment having a presentation time following the missing section; extending the segment timeline according to the data of the at least portion of the first segment; and outputting the media data of the second segment according to the extended segment timeline.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
   determining that a manifest file for a presentation of media data includes a segment timeline element for a first representation of a plurality of representations of the presentation, the segment timeline element including data specifying a missing segment representing a period of time of the first representation for which media data is not available but for which a segment timeline can be extended, the data of the segment timeline element comprising a first attribute having a value representing a start time of the period of time and a second attribute having a value representing a duration of the period of time, the value of the first attribute being expressed in timescale units and relative to a presentation time offset value, the value of the second attribute being expressed in the timescale units, the data specifying the missing segment representing the period of time applying only to the first representation and not to other representations of the plurality of representations;
   retrieving a first set of segments of the presentation including media data having presentation times prior to the period of time;
   retrieving a second set of segments of the presentation including media data having presentation times after the period of time;
   in response to the determination that the manifest file includes the data specifying the period of time:
      omitting retrieval of media data from the first representation having presentation times during the period of time; and
      extending the segment timeline according to the determination.

2. The method of claim 1, wherein the manifest file comprises a media presentation description (MPD).

3. The method of claim 1, wherein the data specifying period of time for which the media data is not available comprises a MissingSection element of the manifest file.

4. The method of claim 1, further comprising determining the start time of the period of time for which the media data is not available using the value of the first attribute, comprising subtracting a value of a presentation time offset element from the value of the first attribute to determine the start time of the period of time for which the media data is not available.

5. The method of claim 1, wherein the first attribute comprises an @t attribute.

6. The method of claim 1, wherein the second attribute comprises an @d attribute.

7. The method of claim 1, further comprising:
   determining a second representation of the plurality of representations of the presentation for which media data is available for the period of time, the second representation being different than the first representation; and
   retrieving the media data of the second representation for the period of time.

8. A device for retrieving media data, the device comprising:
   a memory configured to store media data; and
   one or more processors implemented in circuitry and configured to:
   determine that a manifest file for a presentation of media data includes a segment timeline element for a first representation of a plurality of representations of the presentation, the segment timeline element including data specifying a missing segment representing a period of time of the first representation for which media data is not available but for which a segment timeline can be extended, the data of the segment timeline element comprising a first attribute having a value representing a start time of the period of time and a second attribute having a value representing a duration of the period of time, the value of the first attribute being expressed in timescale units and relative to a presentation time offset value, the value of the second attribute being expressed in the timescale units, the data specifying the missing segment representing the period of time applying only to the first representation and not to other representations of the plurality of representations;
   retrieve a first set of segments of the presentation including media data having presentation times prior to the period of time;
   retrieve a second set of segments of the presentation including media data having presentation times after the period of time;
   in response to the determination that the manifest file includes the data specifying the period of time:
      omit retrieval of media data from the representation having presentation times during the period of time; and
      extend the segment timeline according to the determination.

9. The device of claim 8, wherein the manifest file comprises a media presentation description (MPD).

10. The device of claim 8, wherein the data specifying the period of time for which the media data is not available comprises a MissingSection element of the manifest file.

11. The device of claim 9, wherein the one or more processors are further configured to determine the start time of the period of time for which the media data is not available using the value of the first attribute, comprising subtracting a value of a presentation time offset element from the value of the first attribute to determine the start time of the period of time for which the media data is not available.

12. The device of claim 9, wherein the first attribute comprises an @t attribute.

13. The device of claim 8, wherein the second attribute comprises an @d attribute.

14. The device of claim 8, wherein the one or more processors are further configured to:

determine a second representation of the plurality of representations of the presentation for which media data is available for the period of time, the second representation being different than the first representation; and retrieve the media data of the second representation for the period of time.

15. A non-transitory computer-readable storage medium having stored thereon instructions that, when executed, cause a processor to:

determine that a manifest file for a presentation of media data includes a segment timeline element for a first representation of a plurality of representations of the presentation, the segment timeline element including data specifying a missing segment representing a period of time of the first representation for which media data is not available but for which a segment timeline can be extended, the data of the segment timeline element comprising a first attribute having a value representing a start time of the period of time and a second attribute having a value representing a duration of the period of time, the value of the first attribute being expressed in timescale units and relative to a presentation time offset value, the value of the second attribute being expressed in the timescale units, the data specifying the missing segment representing the period of time applying only to the first representation and not to other representations of the plurality of representations;

retrieve a first set of segments of the presentation including media data having presentation times prior to the period of time;

retrieve a second set of segments of the presentation including media data having presentation times after the period of time;

in response to the determination that the manifest file includes the data specifying the period of time:

omit retrieval of media data from the representation having presentation times during the period of time; and extend the segment timeline according to the determination.

16. The non-transitory computer-readable storage medium of claim 15, wherein the manifest file comprises a media presentation description (MPD).

17. The non-transitory computer-readable storage medium of claim 15, wherein the data specifying the period of time for which the media data is not available comprises a MissingSection element of the manifest file.

18. The non-transitory computer-readable storage medium of claim 15, further comprising instructions that cause the processor to determine the start time of the period of time for which the media data is not available using the value of the first attribute, comprising subtracting a value of a presentation time offset element from the value of the first attribute to determine the start time of the period of time for which the media data is not available.

19. The non-transitory computer-readable storage medium of claim 15, wherein the first attribute comprises an @t attribute.

20. The non-transitory computer-readable storage medium of claim 15, wherein the second attribute comprises an @d attribute.

21. The non-transitory computer-readable storage medium of claim 15, further comprising instructions that cause the processor to:

determine a second representation of the plurality of representations of the presentation for which media data is available for the period of time, the second representation being different than the first representation; and retrieve the media data of the second representation for the period of time.

22. A device for retrieving media data, the device comprising:

means for determining that a manifest file for a presentation of media data includes a segment timeline element for a first representation of a plurality of representations of the presentation, the segment timeline element including data specifying a missing segment representing a period of time of the first representation for which media data is not available but for which a segment timeline can be extended, the data of the segment timeline element comprising a first attribute having a value representing a start time of the period of time and a second attribute having a value representing a duration of the period of time, the value of the first attribute being expressed in timescale units and relative to a presentation time offset value, the value of the second attribute being expressed in the timescale units, the data specifying the missing segment representing the period of time applying only to the first representation and not to other representations of the plurality of representations;

means for retrieving a first set of segments of the presentation including media data having presentation times prior to the period of time;

means for retrieving a second set of segments of the presentation including media data having presentation times after the period of time;

means for omitting retrieval of media data from the representation having presentation times during the period of time in response to the determination that the manifest file includes the data specifying the period of time; and means for extending the segment timeline according to the determination in response to the determination that the manifest file includes the data specifying the period of time.

23. The device of claim 22, wherein the manifest file comprises a media presentation description (MPD).

24. The device of claim 22, wherein the data specifying the period of time for which the media data is not available comprises a MissingSection element of the manifest file.

25. The device of claim 22, further comprising means for determining the start time of the period of time for which the media data is not available using the value of the first attribute, comprising subtracting a value of a presentation time offset element from the value of the first attribute to determine the start time of the period of time for which the media data is not available.

26. The device of claim 22, wherein the first attribute comprises an @t attribute.

27. The device of claim 22, wherein the second attribute comprises an @d attribute.

28. The device of claim 22, further comprising:

means for determining a second representation of the plurality of representations of the presentation for which media data is available for the period of time, the second representation being different than the first representation; and means for retrieving the media data of the second representation for the period of time.

\* \* \* \* \*